United States Patent
Nilsen et al.

(10) Patent No.: US 6,872,239 B2
(45) Date of Patent: Mar. 29, 2005

(54) METHOD AND A SYSTEM FOR SEPARATING A MIXTURE

(75) Inventors: Pål J. Nilsen, Bødalen (NO); Erik A. Wolff, Oslo (NO)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 10/258,957

(22) PCT Filed: Apr. 23, 2001

(86) PCT No.: PCT/IB01/00673

§ 371 (c)(1),
(2), (4) Date: Feb. 3, 2003

(87) PCT Pub. No.: WO01/83075

PCT Pub. Date: Nov. 8, 2001

(65) Prior Publication Data

US 2003/0146175 A1 Aug. 7, 2003

(30) Foreign Application Priority Data

May 4, 2000 (NO) .......................................... 20002350

(51) Int. Cl.$^7$ .......................... B01D 17/038; B01D 19/02
(52) U.S. Cl. ................. 95/30; 95/63; 95/242; 95/253; 95/259; 95/261; 96/55; 96/175; 96/176; 96/208; 96/216; 210/787; 210/512.1
(58) Field of Search .................. 95/30, 242, 253, 95/258, 259, 261, 63; 96/175, 176, 208, 209, 216, 55; 210/787, 512.1

(56) References Cited

U.S. PATENT DOCUMENTS

| | | | |
|---|---|---|---|
| 4,617,031 A | 10/1986 | Suh et al. | 95/243 |
| 4,737,282 A | 4/1988 | Senyard, Sr. et al. | 210/188 |
| 5,302,294 A | 4/1994 | Schubert et al. | 210/702 |
| 6,106,590 A * | 8/2000 | Ueno et al. | 95/30 |
| 6,123,044 A * | 9/2000 | Kuklinski | 114/15 |
| 6,132,494 A * | 10/2000 | Kjos et al. | 95/243 |
| 6,197,095 B1 * | 3/2001 | Ditria et al. | 95/248 |
| 6,299,672 B1 * | 10/2001 | Rivas | 95/243 |
| 6,315,813 B1 * | 11/2001 | Morgan et al. | 95/23 |
| 6,409,808 B1 * | 6/2002 | Chamberlain et al. | 96/182 |
| 6,709,500 B1 * | 3/2004 | West | 96/216 |
| 6,821,322 B2 * | 11/2004 | Milia | 96/209 |

FOREIGN PATENT DOCUMENTS

| | | |
|---|---|---|
| NO | 315340 | 10/2003 |
| WO | 99/25454 | 5/1999 |

* cited by examiner

Primary Examiner—Richard L. Chiesa
(74) Attorney, Agent, or Firm—Venable LLP; Eric J. Franklin

(57) ABSTRACT

A method for separating phases of a mixture comprising and oil-water together with gas. At least a substantial part of the gas is separated from the emulsion before the emulsion is introduced into a separator tank. The oil-water emulsion from which the gas has been separated is conducted to a liquid-liquid cyclone for further separating the phases of the emulsion. The liquid-liquid cyclone is located inside the separator tank. The emulsion is conducted to the separator tank for separating the oil from the water.

23 Claims, 1 Drawing Sheet

METHOD AND A SYSTEM FOR SEPARATING A MIXTURE

FIELD OF THE INVENTION

The present invention relates to a method of separating a mixture, in which the mixture comprising an oil-water emulsion together with gas is conducted to a separator tank for separating the oil from the water. The invention also relates to a system for separating a mixture that comprises an oil-water emulsion together with gas, comprising a separator tank for separating oil from water in the emulsion, and means for separating gas from the emulsion.

The invention is applicable to all sorts of oil extraction plants, including land-based ones, but is particularly applicable to offshore applications, and to applications in which oil is extracted from a plurality of wells simultaneously and where mixtures of oil, water and gas from the individual wells are gathered in a common line which comprises one or more separator tanks for separating oil-water emulsions by means of gravitational settling.

BACKGROUND OF THE INVENTION

Devices that separate gases, liquids and solids work on a variety of principles. In oil extraction applications gravity separators are widely used for the purpose of separating oil from water or vice versa, and also for separating gas from emulsions containing extracted water and oil. Such gravity separators have been used both on land-based crude oil and gas process plants as well as on offshore production platforms, in spite of their significant associated installation costs due to their large space and weight requirements.

Most separation systems handle well streams from several wells. The wells are choked to a common pressure into a manifold and the streams of oil, water, gas and solids extracted from the wells are conducted via a common pipe or line to the separator. To reduce the momentum of the incoming gas/liquid well stream in the separator, inlet devices have normally been mounted inside the separator. Traditionally, the inlet devices have been simple splash plates or sets of vanes, even though, more recently, new inlet cyclones have been introduced to make benefit from high g-forces to eliminate foaming in the separator. However, such inlet cyclones may create a very difficult emulsion of oil and water that often can be impossible to separate in the gravity separator. They also add to the weight, space requirement and complexity of the separator.

Recently, some oil companies experience new challenges for their separation process. The fact that some of the wells are oil continues and some are water continues may cause complex emulsion patterns. Water droplets can trap oil droplets that, in their turn, may trap small water droplets. The various wells must be choked differently, and as a result thereof there will be large variations in droplet sizes. This adds to the complexity of the incoming gas-oil-water mixture. The water cut for each well will change during the production, typically from 0% water to 90% water. Accordingly the inlet separation system needs to be flexible in handling the various types of mixtures. However, there are difficulties in obtaining inlet separation systems that are flexible and that do not add a considerable weight and volume to the separator arrangement.

PRIOR ART

Gravity separators with different solutions to the separator inlet construction are proposed by prior art. One solution is to incorporate a set of gas/liquid multiple hydrocyclones for separating a gas from an oil-water emulsion inside a conventional horizontal or vertical gravity separator. This design takes advantage of both the centrifugal force of the hydrocyclone and gravity as in a conventional separator. Most of the basic separation of gas from the liquid will be done by the hydrocyclone and main focus has been on reducing foaming of the inlet flow. The oil-water emulsion might, however, become negatively affected in the way indicated above, i.e. become more complex and hard to separate by means of gravitational settling in the separator tank.

U.S. Pat. No. 4,617,031 discloses an apparatus for separating multiphase mixtures of gas and oil from liquids, such as petroleum production fluids. The apparatus includes a centrifugal gas/liquid separator arranged inside a gravity separator. The device functions by initially separating the gas from the oil by centrifugation in the conical separator, then by allowing the remaining liquid to further separate by gravity in the retention area of the gravity separator. Special de-misters and a sandtrap are also arranged inside the separator for handling gas and sand that has been separated from the oil-water emulsion.

WO 99/25454 discloses a conventional gravity separator comprising a separation vessel incorporating an inlet assembly through which a production flow from an oil well is introduced into the vessel. The production flow contains a mixture of gas, oil and water, which can separate under gravity in the vessel into vertically discrete gas, oil and water layers. The inlet assembly includes a gas/liquid cyclone separator for separating the production flow into gas and liquid phases. It is known that the use of such a cyclone inlet assembly improves the efficiency of a gravity separator by pre-separating a proportion of the gas phase and by minimising foaming of the inlet flow which otherwise can occur.

However, a centrifugal gas/liquid cyclone separator as described above requires a considerable space inside the gravity separator, thereby contributing to a large and heavy gravity separator arrangement. The oil-water emulsion might also be negatively affected by the treatment it is subjected to in the centrifugal separator, such that its complexity is increased and it becomes difficult to separate by means of gravitational settling in the gravity separator. Another disadvantage is that the gas separated by the centrifugal gas/liquid cyclone may take up a relatively large volume in the gravity separator leading to a correspondingly decreased oil/water separation volume, which will either result in a large and heavy gravity separator arrangement or a relatively smaller production rate of oil. From this point of view the gravity separator arrangement also seems to be less flexible.

OBJECT OF THE INVENTION

It is an object of the invention to provide a method and a system which promotes the design of a small, light and efficient gravity separator for the separation of oil from water in an oil-water emulsion. The invention shall also present a method and a system by means of which different components extracted from one or more wells are efficiently separated into their phases in such a way that an overall control of the separation system is facilitated with optimum flexibility.

SUMMARY OF THE INVENTION

The object of the invention is achieved by means of the initially defined method, which is characterised in that at least a substantial part of the gas is separated from the mixture or, more precisely, from the oil-water emulsion before the emulsion is introduced into the separator tank. The emulsion may then easily be further treated before being introduced into the separator for the purpose of making it easier to separate by means of gravitational separation.

According to a preferred embodiment, the gas, which has been separated from the oil-water emulsion, is conducted separately to the separator tank and is subjected to a defoaming operation before being introduced into the separator and/or to a compressor, preferably via a scrubber. Thereby, no or only small defoamers are needed inside the separator. The defoaming operation preferably includes subjecting the gas to ultrasound for the purpose of breaking foam into its individual components, that is gas and liquid respectively.

The emulsion from which the gas has been separated is preferably subjected to a coalescing operation before being introduced into the separator tank. By means of such an operation the droplet size of the dispersed phase in the emulsion is increased. Thereby, subsequent gravitational separation of the emulsion in the separator tank is promoted.

Preferably, the emulsion from which the gas has been separated is introduced into the separator tank via a liquid/liquid cyclone for further separating the phases of the emulsion. Such a cyclone is preferably arranged at the inlet, inside the separator. Thereby the emulsion, which might have become rather complex due to it being extracted from different wells and subjected to the treatment in a foregoing gas/liquid separator, is pre-treated to become more easily separated by means of gravitational separation in the separator. The separator is preferably a gravity separator.

Normally, solid particles such as sand are present together with the gas and the liquid in the emulsion. Preferably at least a substantial part of the extracted sand is separated from the emulsion before the latter is introduced into the separator tank. Thereby, the need of a large sandtrap at the bottom of the separator tank is reduced. The number of sprinklers and sand outlets in the sandtrap can be heavily reduced, and the sandtrap does not need to be emptied as often as would otherwise be necessary.

The objective of the invention is also achieved by means of the initially defined system, which is characterised in that the means for separating the gas from the oil-water emulsion is arranged separately upstream of the separator tank. Upstream is referred to as upstream with reference to the flow direction of the emulsion, which flows from the well or wells to the separator tank in one or more dedicated pipes or conduits.

The inventive system comprises a conduit for separately conducting the separated gas from the gas separation means to the separator tank. Thereby it will be possible to pre-treat the gas before it is introduced into the separator tank. Preferably, the system comprises a defoamer for removing foam from the gas before it is introduced into the separator tank. The defoamer is arranged to break the foam into gas and liquid. The separate gas line also makes it possible to precisely control the amount of gas conducted to the separator tank. This allows for a reduced gas volume in the separator tank with an increased oil/water separation volume.

According to a preferred embodiment of the invention the system comprises means for separating sand from the extracted oil-water emulsion. The sand separating means are arranged upstream of the separator tank in the emulsion flow line in order to remove sand from the emulsion or liquid before the latter is introduced into the separator tank. Thereby, the need of a large sandtrap at the bottom of the separator tank is reduced. Even though some sort of a sandtrap still might be needed, it does not need to be as powerful as before. The number of sprinklers and sand outlets in the sandtrap can be heavily reduced, and the sandtrap does not need to be emptied as often as would otherwise be necessary. This, in its turn, promotes the positioning of the separator tank submerged into the water instead of on top of an offshore platform.

The means for separating sand from the oil-water emulsion comprises a first cyclone in which there is a first pressure fall as a slurry comprising residual emulsion and the sand is separated from the major part of the emulsion, and at least one second cyclone for separating the sand from the emulsion under a second pressure fall, the second pressure fall being substantially larger than the first pressure fall. Thereby, energy consumption is reduced and the residual emulsion is efficiently taken care of. Preferably, the system comprises a conduit for conducting the residual emulsion separated from the sand in the second cyclone to the separator tank. Possibly, it comprises a pump means for pumping the residual emulsion from the second cyclone to the separator or to the main conduit via which the emulsion extracted from the first cyclone is conducted to the separator. The residual emulsion may alternatively be routed to a second stage separator operating at a lower pressure, thereby eliminating the need of a pump.

According to a preferred embodiment, the system comprises a liquid-liquid cyclone for the pre-treatment or pre-separation of the emulsion before the latter is subjected to separation by means of gravitational settling in the separator tank. Preferably, this cyclone is arranged at the inlet, inside the separator tank. By means of this cyclone complex emulsions that would otherwise be difficult to separate through gravity settling are treated for the purpose of making them easier to separate in the subsequent gravity separation step.

Further advantages and features of the present invention will be described in the following, detailed description.

BRIEF DESCRIPTION OF THE DRAWINGS

The invention will now be described more in detail with reference to the drawings, in which.

DETAILED DESCRIPTION OF PREFERRED EMBODIMENTS

Figure 1:
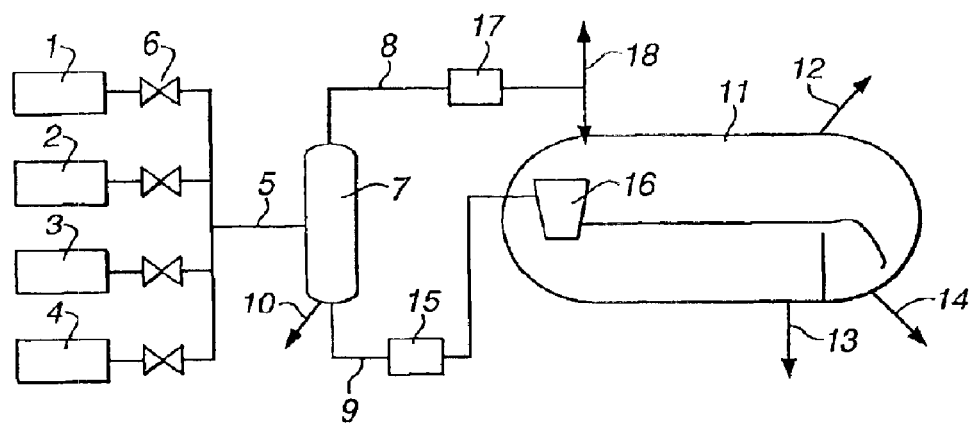
FIG. 1 is a schematic view of a first embodiment of the inventive system.

FIG. 1 shows the inventive system according to a first embodiment. The system is connected to a plurality of wells 1–4 from which oil is extracted. Together with the oil, water and gas, sand is also expected to get extracted from the wells 1–4. The ratio between these components is likely to change with time. Individual ratio differences between the wells are also likely to exist.

The oil-water-gas mixtures with their content of sand are gathered in a common line or conducting means 5. As there might be different pressures in the different wells 1–4 the system comprises valve arrangements 6 for regulating the individual contributions from the wells 1–4. The resulting mixture is then conducted via the conducting means 5 to a gas/liquid cyclone 7 which separates the gas and the oil/water in separate streams flowing in separate conduits, preferably tubes or pipes, 8, 9. The cyclone 7 preferably has the same features as the cyclone disclosed in the applicants Norwegian patent application no. NO 19993985. Thereby optimum emulsion control in the cyclone can be obtained. This is important in order to make it possible to assess the changing emulsion properties that will be experienced during the life time of the field. In addition, the cyclone 7 is designed for the purpose of removing sand from the oil-water emulsion. A sand outlet from the cyclone 7 is schematically shown and denoted 10 in FIG. 1.

The system also comprises at least one gravity separator 11 designed and arranged for the purpose of separating oil from water in the oil-water emulsion delivered to it via the oil-water emulsion tube or pipe 9. In the gravity separator 11 gas still remaining in the oil-water emulsion is also removed from the emulsion as it is allowed to ascend to an upper part of the separator tank 11 while, simultaneously, the water is separated from the oil through gravitational settling in a lower region of the separator 11. Accordingly, the separator 11 comprises a gas outlet 12, a water outlet 13 and an oil outlet 14.

In the emulsion delivery line 9 from the cyclone 7 to the separator 11 the system comprises a coalescer 15 by means of which the emulsion is pretreated. This pre-treatment preferably includes subjecting the emulsion to microwave radiation by means of a microwave device for the purpose of accomplishing a separate heating of only the water, but not the oil, in the emulsion, and thereby obtaining a kind of pre-separation of the components of the emulsion before the latter reaches the gravity separator 11. The coalescer 15 preferably also comprises a coalescing medium which gets in contact with the emulsion and which has such a polarity that it attracts one of the emulsion components substantially more than it attracts the other component. For example, when the emulsion comprises water droplets in a continous oil phase, a polar polymer such as PA or PMMA is a preferred coalescing medium. The main feature of the inline coalescer is the ability to increase the droplet size of the dispersed phase in the emulsion or liquid stream. Alternatively or as a supplement to the microwave device, the coalescer may include an electrostatic device or an ultrasound generator.

The system also comprises a liquid/liquid cylone 16 arranged for the purpose of pre-separating oil from water in the oil-water emulsion before the latter is subjected to the gravity separation process in the separator 11. The cyclone 16 is arranged inside the gravity separator tank 11. The coalescer 15 is arranged upstream of the cyclone 16 as seen in the emulsion flow direction. By means of the cyclone 16 complex emulsions are treated such that they become easier to separate through gravity separation in the separator 11. The cyclone 16 is primarily adapted to the separation of one liquid from another, and not for the separation of a gas from a liquid. Thereby, a low cyclone flow speed can be used, which is an advantage when seeking to avoid complex emulsions.

In line with the tube or pipe 8 for conducting the gas from the gas/liquid separator 7 the system comprises a defoamer 17 for removing foam from the gas. Here the gas is conducted via the tube or pipe 8 all the way into the upper part of the separator tank 11. As foam is removed from the gas by means of the defoamer 17 before it is introduced into the separator tank 11, special defoamer arrangements inside the separator 11 can be avoided, which is an advantage. The defoamer 17 is arranged to break the foam into its main components, in this case gas, oil and water. The defoamer 17 preferably comprises an ultrasound generator or a mechanical shear device, for the purpose of subjecting the gas/foam to ultrasound or mechanical shear that breaks or splits the foam, thereby contributing to lesser need of any chemical agents for accomplishing a defoaming effect.

As an alternative or supplement to the means for conducting the gas into the separator tank 11 via the tube/pipe 8, the system may include means (not shown) for routing the gas directly to a scrubber upstream of a gas compressor with just a pressure balance connection to the separator tank. Such means preferably comprises a separate pump and valve arrangement. The alternative gas tube/pipe is indicated by reference number 18 in FIG. 1.

Figure 2:
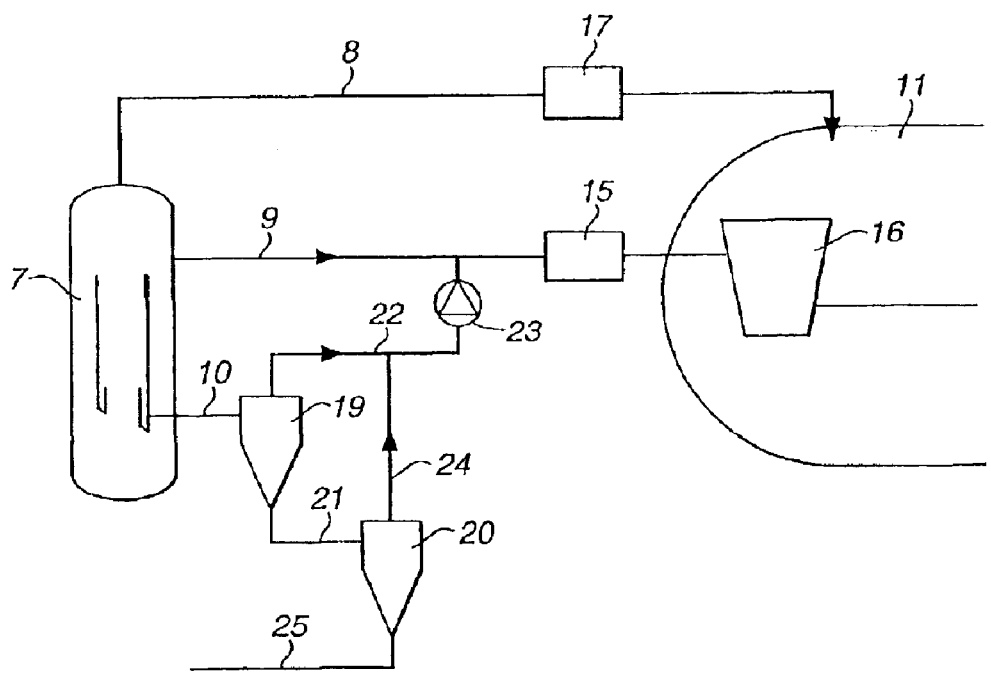
FIG. 2 is a schematic view of a further development of the inventive system according to FIG. 1.

FIG. 2 shows a second embodiment of the inventive system, which is a further development of the embodiment shown in FIG. 1. Here, the system comprises two further liquid-sand cyclones 19, 20 arranged downstream the cyclone 7 in the flow direction of a sand-liquid slurry separated from the cyclone 7 via the sand outlet 10 mentioned above. The gas-liquid-sand cyclone 7 defines a first cyclone in which there is a first pressure fall as the slurry comprising residual emulsion and sand is separated from the major part of the emulsion which is conducted via the tube or pipe 9 from the first cyclone 7. The sand-liquid cyclones 19, 20 define second cyclones in which the residual emulsion is separated from the sand. In at least one of the second cyclones 19, 20 the pressure fall is substantially larger than in the first cyclone 7. A slurry consisting of residual emulsion and sand, but with less emulsion than the slurry that is introduced into it, is extracted via the tube or pipe 21 from a first one 19 to a second one 20 of the sand-liquid cyclones. Via another pipe or tube 22 residual emulsion separated from the slurry in the cyclone 19 is conducted to the main emulsion line 9 by means of a pump 23 and further conducted to the coalescer 15 and the gravity separator 11. In the second one 20 of the second cyclones 19, 20 the slurry delivered via the pipe/tube 21 is further separated, and the obtained emulsion or liquid is separated and conducted via a pipe/tube 24 to the main emulsion line 9 and further on to the gravity separator 11. Via a sand outlet 25 sand is removed from the last one 20 of the second cyclones 19, 20. Thanks to the stepwise separation of sand from emulsion by means of the first cyclone 7 and the second cyclones 19, 20 the pressure fall in the first cyclone 7 can be kept at a fairly low level, which is advantageous from an economical as well as practical and technical point of view. The emulsion reaching the gravity separator 11 will have a very low sand content, and therefore there will be less need of a repeated removal of sand from the bottom of the gravity separator 11.

Even though the embodiment according to FIG. 2 comprises two second cyclones it should be understood that the number of second cyclones is purely a matter of optimisation in each single case, and that the inventive system might comprise other numbers of such cyclones for obtaining a stepwise separation of oil-water emulsion from sand. It should also be understood that pump and/or valve arrangements are likely to be needed for the purpose of delivering the emulsions via the pipes/tubes 22, 24 to the main emulsion line 9.

The design of the inventive system promotes subsea applications in which the whole system is arranged at the bottom of the sea instead of at least partly on an offshore platform. Such a subsea system preferably comprises a pipeline for the direct transportation of oil obtained from the gravity separator or separators 11 to land-based plants. Of course, it might as well comprise a pipeline for the transportation of gas from any of the cyclones or gravity separators to land-based plants or consumers. Accordingly the invention also includes such subsea systems and applications. Of course, the invention is also applicable to land-based sites, and it may be implemented on any top side arrangement on land as well as offshore.

Of course, a plurality of alternative embodiments will be obvious for a man skilled in the art without leaving the scope of invention, as defined in the appended claims, supported by the description and the drawings. However, the claimed subject matter also covers such alternative embodiments.

For example, the number of second cyclones 19, 20 is optional and subject to process optimisation in each single case.

What is claimed is:

1. A method for separating phases of a mixture comprising an oil-water emulsion together with gas, the method comprising:
   separating at least a substantial part of the gas from the emulsion before the emulsion is introduced into a separator tank;
   conducting the oil-water emulsion from which the gas has been separated to a liquid-liquid cyclone for further separating the phases of the emulsion, the liquid-liquid cyclone being located inside the separator tank; and
   conducting the emulsion to the separator tank for separating the oil from the water.

2. The method according to claim 1, further comprising:
   separately conducting the gas separated from the oil-water emulsion to the separator tank and/or to a scrubber.

3. The method according to claim 1, further comprising:
   subjecting the gas to a defoaming operation before being introduced into the separator tank.

4. The method according to claim 1, further comprising:
   subjecting the emulsion to a coalescing operation after separating the oil-water emulsion from the gas and before introducing the oil-water emulsion into the separator tank, wherein the coalescing operation comprises increasing a droplet size of dispersed phases in the emulsion.

5. The method according claim 1, wherein to the oil-water emulsion comprises sand, and wherein at least a substantial part of the sand is separated from the oil-water emulsion before the oil-water emulsion is introduced into the separator tank.

6. The method according to claim 5, wherein the sand is separated from the oil-water emulsion by means of a first cyclone with a first pressure drop and wherein, subsequently, a slurry containing residual emulsion and the separated sand is conducted to and treated in a second cyclone with a second pressure drop for the purpose of separating the sand from the residual emulsion, the second pressure drop being substantially larger than the first pressure drop.

7. The method according to claim 5, wherein the separation is performed offshore, and the separation of the sand and/or gas is performed by means of one or more devices located in a submerged position.

8. A system for separating phases of a mixture that comprises an oil-water emulsion together with gas, the system comprising:
   a separator tank operative to separate the oil from the water in the emulsion by gravitational settling;
   means for separating the gas from the oil-water emulsion arranged separately upstream of the separator tank; and
   a liquid-liquid cyclone operative to pretreat the emulsion before the emulsion is subjected to separation in the separator tank, the liquid-liquid cyclone being located inside the separator tank.

9. The system according to claim 8, further comprising:
   a conduit for separately conducting the separated gas from the gas separation means to the separator tank.

10. The system according to claim 8, further comprising:
    a defoamer operative to remove foam from the separated gas before the separated gas is introduced into the separator tank.

11. The system according to claim 10, wherein the defoamer is arranged to break the foam into gas and liquid.

12. The system according to claim 10, wherein the defoamer comprises an ultrasound generator.

13. The system according to claim 10, wherein the defoamer comprises a mechanical shear device.

14. The system according to claim 8, further comprising:
    means for separating sand from the extracted oil-water emulsion, the sand separating means being arranged upstream of the separator tank in the emulsion flow line in order to remove sand from the emulsion before the emulsion is introduced into the separator tank.

15. The system according to claim 14, wherein the means for separating sand from the emulsion comprises a first cyclone in which there is a first pressure drop as a slurry comprising residual emulsion and the sand is separated from a major part of the emulsion, and at least one second cyclone for separating the sand from a residual emulsion under a second pressure drop, the second pressure drop being substantially larger than the first pressure drop.

16. The system according to claim 15, further comprising:
    a conduit for conducting the residual emulsion separated from the sand in the second cyclone to the separator tank.

17. The system according to claim 15, the first cyclone is a three phase separator in which the gas, emulsion and sand/emulsion slurry are separated from each other.

18. The system according to claim 8, further comprising:
    a coalescer operative to treat emulsion that has been separated from the gas and which is conducted to the separator tank.

19. The system according to claim 18, wherein the coalescer is located upstream from the liquid/liquid cyclone with respect to the emulsion flow direction.

20. The system according to claim 18, wherein the coalescer comprises a microwave device.

21. The system according to claim 18, wherein the coalescer comprises an ultrasound generator.

22. A system according to claim 18, wherein the coalescer comprises an electrostatic device.

23. Use of a system according to claim 8 an offshore system for offshore extraction and separation of oil.

* * * * *